Jan. 21, 1964 H. A. ROSSEN 3,118,229
CHEESE MOULDS
Filed Dec. 16, 1960
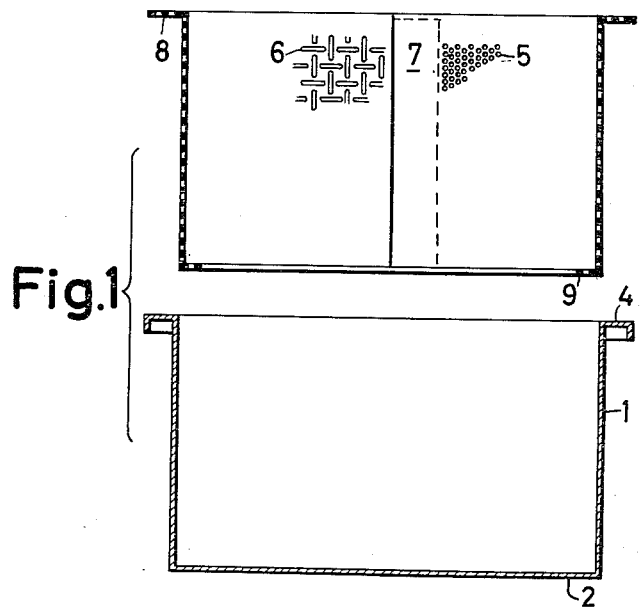
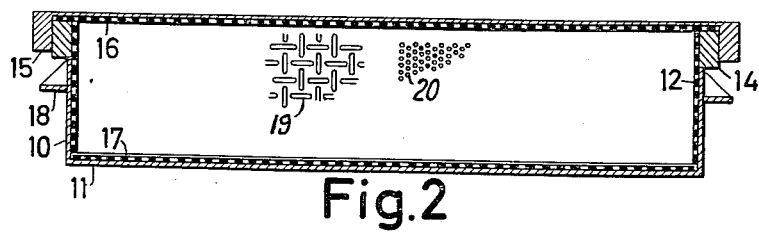
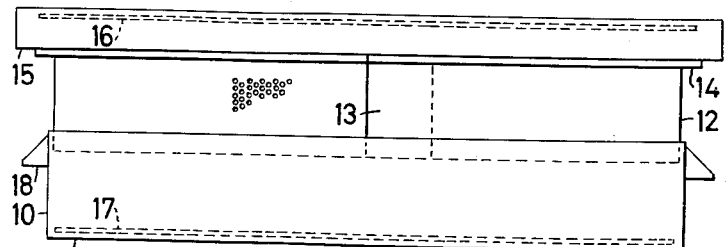
INVENTOR
Hans Andreas Rossen
BY Stevens Davis Miller & Mosher
ATTORNEYS

United States Patent Office 3,118,229
Patented Jan. 21, 1964

3,118,229
CHEESE MOULDS
Hans Andreas Rossen, Tiset near Gram, Denmark
Filed Dec. 16, 1960, Ser. No. 76,302
5 Claims. (Cl. 31—45)

This invention concerns improvements in and relating to cheese moulds.

Cheese moulds are known for the production of pressed cheeses which consist of an outer side wall and bottom, and an inner split wall or shell, which can slide into and out of the outer wall and which, during at any rate the greater part of the pressing operation, bears against the outer wall.

Such a shell is generally made from thin sheet metal bent to conform to the shape of the outer side wall, the length of the sheet metal being such that at one or both sides of the shell, depending on whether the shell is made of one or more than one part, there will be abutting or overlapping edges of the sheet metal when the shell is inserted into the outer side wall. Such a shell is referred to herein as an inner split side wall or shell.

In these known moulds, whether it was desired to produce cheeses with rinds or so-called rind-free cheeses, it is known before the pressing of the cheese mass, to wrap the latter in a cheese cloth both to ensure the necessary drainage possibility for the whey from the cheese mass during the pressing, and to ensure that the ready-pressed cheese will easily slip from the mould during its removal from the latter without damage to the surface of the cheese.

Of late years, the so-called "cloth-free" cheese moulds have also made their appearance. These moulds are used without cheese cloth and are particularly intended for the production of cheeses of the Havarti-type (the Tilsiter type) or like semi-hard or hard cheeses which are not, or only to a slight degree, subjected to pressing except for the pressing resulting from the weight of the cheese mass proper. Such cheeses were previously produced using cheese-cloth. These moulds have a single wall and bottom and possibly a lid of a comparatively thin stainless steel-plate which is perforated in such a way as to be provided with a number of evenly distributed fine holes located closely together and with a diameter which is normally of the order of magnitude of 0.8–1.5 mm. In the moulds on the market there are several, normally at least 5 holes per cm.$^2$ of plate.

Experiments with the use of cheese moulds of this type—without cheese cloth—for the production of pressed cheese have encountered certain difficulties, even though their use offers advantages as compared with the known production of pressed cheeses in moulds with cheese cloth. It has, for example, been found that a small quantity of the cheese mass may sometimes, particularly when a high pressure is used, be pressed out through the holes, which results in difficulties in removing the pressed cheese from the mould and in a less attractive surface of the cheese even when an openable mold is used. Attempts at avoiding this disadvantage by using smaller holes result in the difficulty that, as far as the perforation of the plate is concerned, there is in practice a limit to how small the holes can be made, because the plate thickness must be above a certain minimum value to obtain the desired strength of the mold wall and its resistance to bending during the pressing operation.

Further experiments have, however, surprisingly shown that the above mentioned difficulties can be avoided by the present invention which relates to a cheese mould of the known type mentioned above having an inner split wall or shell, which, during at any rate the greater part of the pressing operation, bears against the inside of the outer side wall and can slide into and out of the remainder of the mould. The mould is characterized in that the said shell preferably made of metal, such as stainless steel, and the associated bottom or/and lid are provided with several perforation holes per cm.$^2$ of surface, said holes having a diameter not exceeding about 1.0 mm. and preferably being less and being distributed uniformly over at any rate the part of the surface area which will be in contact with the cheese mass, whereas the surrounding outer side wall, likewise preferably made of metal, such as stainless steel, and the associated bottom or/and lid is substantially unperforated, the external surface of the shell or/and the internal surface of the outer side wall being provided with low, preferably uniformly distributed protuberances, which in the case of the shell are so designed that the surface of the cheese is not damaged, particularly when the latter is removed from the mould. The outer wall may, however, be provided with some, substantially larger holes for the discharge of whey in a manner known per se.

It has been found surprisingly that even if the whey leaving the mass during the pressing—without the use of cheese cloth—can easily drain off, either through discharge holes in the outer wall or, if the outer wall has no such holes, along the outer wall, and between this wall and the shell, no cheese mass will, as in the case mentioned above penetrate through the holes, at any rate not to any inconvenient degree, even if a high pressure is used. It will furthermore very easily be possible to remove the cheese from the mould with no damage to the surface of the cheese. The said surface will moreover appear as a very attractive, whole, and smooth surface. If the mould in question is provided with an "internal" lid, i.e. a lid which during the pressing is pressed down into the cavity of the mould with its edge sliding against the shell, there may, as is the case with the known moulds, in which cheese cloth is used, be formed a pressed-out edge which can be cut away in the usual manner. If the mould in question is provided with an "external" lid, i.e. a lid with an edge which during the pressing operation lies around the outside of the upper edge of the shell, such a pressed-out edge may be completely avoided. Particularly in the latter case the mould is normally used in such a way that the shell is first inserted only partly into the mould, detachable supports being provided if required upon which the lower edge of the shell can rest. Next, such a quantity of cheese mass is filled into the mould as according to experience will, after pressing with the desired pressure strip of perforations around the lowermost edge of the shell is just pressed down onto, or slightly above, the bottom. Next the lid is put on and the pressing carried out, whereby the shell is pressed down into the mould, the supports for the shell, if any, having already been removed. In the case that the shell should not owing to too great a quantity of cheese mass be pressed right down to the bottom, it may be convenient to provide a small strip of perforations around the lowermost edge of the outer wall. It should be noted that only during a comparatively small part of the pressing time, and only while the pressure is still comparatively low, will the shell project to any great extent above the edge of the outer wall, so that no drawbacks will for that reason occur with respect to the pressing out of the cheese mass.

In practice a mould is preferably used where the external surface of the shell is provided with rounded protuberances. These protuberances may be produced by embossing the plate of which the shell is made. The embossing of a stainless steel plate gives the plate a higher resistance to bending, and for this reason a thinner plate may, if so desired, be used than would otherwise be the case, and the use of thinner plate, besides other advantages, means that, if so desired, somewhat finer holes may be produced. A particular advantage of the construction of the mould according to the invention is, however, that it is no longer essential that very fine holes should be used as in the case of pressing cheese mass in a perforated one piece mould.

The protuberances in the embossed pattern may be of varying shape and/or height. Whether a given design of the protuberances is satisfactory may be comparatively easily tested by experiments. In an embodiment of the cheese mould with embossed shell, the protuberances are according to the invention preferably of oval or round shape and at their rims merge gradually, i.e. without any sharp edges, into the surrounding surface. According to the invention the height of the protuberances may conveniently be from ½ to 1 mm. The embossed pattern may vary. When the protuberances are of the oval shape mentioned above in the surface of the plate, the longitudinal axes of protuberances located side by side may be way of example everywhere lie at right angles to each other in the embossed pattern. But the embossing may assume many other shapes and otherwise be as specified in the inventor's German patent specification No. 1,030,612.

For most pressed cheeses it will be advantageous to have as many small perforation holes as possible per $cm.^2$ of the perforated part of the shell, and normally for obtaining best results the number of holes per $cm.^2$ should not be less than about 25 and preferably should be up to about 50 or more per $cm.^2$. However, there is a surprising exception, viz. cheeses of the cheddar type. Attempts to press cheddar cheese mass in a mould having a shell with a great number of perforation holes per $cm.^2$—such as will normally be used in the production of other pressed cheeses—led to very bad results in that the pressed cheese was sticking to the shell and had to be removed by cutting it out thus spoiling the surface of the cheese completely. Surprisingly it proved that by making the number of holes per $cm.^2$ somewhat smaller—but still above the limit mentioned above—the pressing of cheddar cheese mass was successful. Indeed the number of holes should not exceed 25, and preferably not exceed 15 to 20 holes per $cm.^2$ of the perforated part of the shell.

The invention will be explained in detail in the following in connection with the examples of cheese moulds according to the invention illustrated in the drawing.

In the drawing

FIG. 1 shows diagrammatically and in section an embodiment of a cheese mould according to the present invention with a raised perforated and embossed shell, FIG. 2 illustrates in section another embodiment of the cheese mould with a perforated and embossed shell pushed completely into the mould, and FIG. 3 illustrates a front view of the same mould with the shell, with the lid on, pushed only partly down into the mould.

The mould in FIG. 1 has an outer wall 1 and a bottom 2 which may expediently be made of a metal such as stainless steel. The outer wall has an edge 4 which serves as a lifting member. The shell 3 is provided with fine perforation holes 5 and an embossed pattern 6. The diameter of the perforation holes is about 0.8 mm. and they are provided in a number 20 to 30 or more per $cm.^2$ of the plate. The ends 7 of the shell overlap each other when the shell is inserted into the mould. The shell is provided with an upper outwardly bent edge 8 which, when the shell has been inserted into the mould, can rest on the outwardly bent edge 4 of the outer wall and which also increases the strength of the shell. In the embodiment shown, the shell is furthermore provided with a lower inwardly bent edge 9 which may serve as a support for a bottom plate. The mould furthermore comprises a lid (not shown) which can slide down into the cavity of the mould in the manner mentioned above.

The embodiment shown in FIGS. 2 and 3 has an outer wall 10 and a bottom 11. The shell 12 has, as is the case with the embodiment mentioned above, mutually overlapping edges 13. Around the upper edge of the shell there is a split reinforcing edge 14 which, if during the pressing operation the shell is pressed right down into the mould, can rest on the upper edge of the outer wall 10. The mould is furthermore provided with a lid 15, on the inner side of which a steel plate 16 is laid, which plate is perforated and embossed like the shell as indicated at 19 and 20, respectively, in FIGURES 2 and 4. Said plate may be secured to the lid or preferably be loosely mounted. Plate 16, as shown in FIGURE 2, is not physically secured to lid 15 but is loosely disposed therein so that it is held between lid 15 and edge 14 when the cheese is properly compressed. A similar plate 17 is disposed on the bottom of the mould. Also this plate is, with a view to cleaning, preferably loosely mounted. The mould is moreover provided with a handle or other carrying member 18.

The invention is not limited to the specific embodiments described above, it being possible to make many modifications of the latter without deviating from the principle of the invention. The moulds may, for example, be provided with loose bottoms which e.g. may be designed like the lid 15 in FIGS. 2 and 3.

I claim:

1. A cheese mould for producing a hard cheese by pressing the cheese therein without destroying the surface of the finished product and allowing the proper drainage comprising an outer member including side walls and a bottom, an inner split shell member made of sheet metal including a side wall and bottom, said shell member being perforated with a plurality of small holes having a diameter not exceeding about 1.0 mm., and protuberance means disposed on the outer surface of said shell member and providing portions in supporting contact with said outer member to provide a small drainage space surrounding the side walls and bottom of said shell member, and means for compressing cheese within said inner shell member.

2. The mould of claim 1 wherein said protuberance means are formed integral with said shell member and extend outwardly therefrom and contact the inner surface of said outer member.

3. A cheese mould as claimed in claim 1, in which the protuberances are embossed in the shell and are of rounded shape, merging gradually into the surrounding surface.

4. A cheese mould as claimed in claim 1, in which the height of the protuberances is from ½ to 1 mm.

5. A cheese mould as claimed in claim 1 and designed especially for pressing cheddar type cheese mass, which mould is further characterised in that the number of perforation holes per $cm.^2$ of the surface of the shell does not exceed 25.

References Cited in the file of this patent

UNITED STATES PATENTS

| 672,129 | Macy | Apr. 16, 1901 |
| 1,415,942 | Meyers | May 6, 1922 |
| 1,418,242 | Fieldman | May 30, 1922 |
| 2,625,877 | Pullen | Jan. 20, 1953 |

FOREIGN PATENTS

| 1,030,612 | Germany | May 22, 1958 |